United States Patent [19]

Denio et al.

[11] Patent Number: 5,355,485
[45] Date of Patent: Oct. 11, 1994

[54] FIRST PROCESSOR FOR DIVIDING LONG ARGUMENT DATA INTO PACKETS AND STORING TOTAL PACKET COUNT AND PACKETS IN SHARED BUFFER FOR SUBSEQUENT EXECUTION BY SECOND PROCESSOR

[75] Inventors: Michael A. Denio, Sugar Land; James G. Littleton, Houston, both of Tex.

[73] Assignee: Texas Instruments Incorporated, Dallas, Tex.

[21] Appl. No.: 25,901

[22] Filed: Mar. 3, 1993

Related U.S. Application Data

[63] Continuation of Ser. No. 420,440, Oct. 12, 1989, abandoned.

[51] Int. Cl.$^5$ ............................................. G06F 13/00
[52] U.S. Cl. .................................... 395/650; 395/200; 370/60; 364/230.3; 364/238.6; 364/281.3; 364/DIG. 1; 364/926.1; 364/931.44; 364/931.46
[58] Field of Search ................. 364/200, 900, DIG. 1, 364/DIG. 2; 395/200, 650, 700, 800, 325; 370/60

[56] References Cited

U.S. PATENT DOCUMENTS

| | | | |
|---|---|---|---|
| 4,374,428 | 2/1983 | Barnes | 395/250 |
| 4,414,624 | 11/1983 | Summer, Jr. et al. | 395/650 |
| 4,445,176 | 4/1984 | Burk et al. | 364/200 |
| 4,486,854 | 12/1984 | Yuni | 395/425 |
| 4,500,960 | 2/1985 | Babecki et al. | 364/200 |
| 4,530,051 | 7/1985 | Johnson et al. | 395/200 |
| 4,539,637 | 9/1985 | DeBruler | 364/200 |
| 4,564,901 | 1/1986 | Tomlinson et al. | 395/650 |
| 4,567,562 | 1/1986 | Fassbender | 395/425 |
| 4,646,231 | 2/1987 | Green et al. | 395/650 |
| 4,649,473 | 3/1987 | Hammer et al. | 395/200 |
| 4,727,537 | 2/1988 | Nichols | 370/85.2 |
| 4,768,150 | 8/1988 | Chang et al. | 395/700 |
| 4,777,588 | 10/1988 | Case et al. | 395/800 |
| 4,815,039 | 3/1989 | Tai et al. | 365/189.07 |
| 4,825,354 | 4/1989 | Agrawal et al. | 395/600 |
| 4,829,475 | 5/1989 | Ward et al. | 365/78 |
| 4,839,866 | 6/1989 | Ward et al. | 365/221 |
| 4,849,877 | 7/1989 | Bishop et al. | 395/200 |
| 4,851,988 | 7/1989 | Trottier et al. | 395/200 |
| 4,864,543 | 9/1989 | Ward et al. | 365/221 |
| 4,873,625 | 10/1989 | Archer et al. | 364/200 |

(List continued on next page.)

OTHER PUBLICATIONS

Birrell et al, "Implementing Remote Procedure Calls", ACM Trans. on Computer Systems, vol. 2, No. 1, Feb. 1984, pp. 39–58.

Spector, A., "Performing Remote Operations Efficiently on a Local Computer Network," Communications of the ACM, vol. 25, No. 4, pp. 246–260 (Apr. 1982).

Jackson, P., "Unix variant opens a path to managing multiprocessor systems," Electronics, pp. 118–124 (Jul. 28, 1983).

Hughes, R. P., "The Transparent Remote File System," pp. 306–317.

Noren, G., IBM RT PC SNA Access Method Guide and Reference, pp. 9–34 to 9–52 (Aug. 15, 1986).

Primary Examiner—Thomas C. Lee
Assistant Examiner—Paul Harrity
Attorney, Agent, or Firm—Robert D. Marshall, Jr.; James C. Kesterson; Richard L. Donaldson

[57] ABSTRACT

A method is provided for adding extended functions to a multiprocessor system, specifically, functions that may be called from programming running on a first processor and executed by a second processor. The function may have an argument that requires a large amount of argument data. Each extended function is associated with a special entry point command, which is in turn, associated with a communications routine that handles the transfer of the large argument data from the first processor to the second processor in bursts.

13 Claims, 4 Drawing Sheets

U.S. PATENT DOCUMENTS

| | | | |
|---|---|---|---|
| 4,882,674 | 11/1989 | Quint et al. | 395/700 |
| 4,891,788 | 1/1990 | Kreifels | 365/49 |
| 4,901,231 | 2/1990 | Bishop et al. | 364/200 |
| 4,914,570 | 4/1990 | Peacock | 364/200 |
| 4,920,483 | 4/1990 | Pogue et al. | 395/425 |
| 4,933,901 | 6/1990 | Tai et al. | 365/189.07 |
| 4,949,255 | 8/1990 | Gerth et al. | 364/200 |
| 5,056,003 | 10/1991 | Hammer et al. | 364/200 |
| 5,062,040 | 10/1991 | Bishop et al. | 395/650 |
| 5,073,852 | 12/1991 | Siegel et al. | 395/700 |
| 5,124,909 | 6/1992 | Blakely et al. | 395/200 |
| 5,132,964 | 7/1992 | Esaki | 370/60 |
| 5,146,593 | 9/1992 | Brandle et al. | 395/700 |
| 5,159,686 | 10/1992 | Chastain et al. | 395/650 |
| 5,210,874 | 5/1993 | Karger | 395/650 |
| 5,218,699 | 6/1993 | Brandle et al. | 395/650 |
| 5,261,095 | 11/1993 | Crawford et al. | 395/650 |

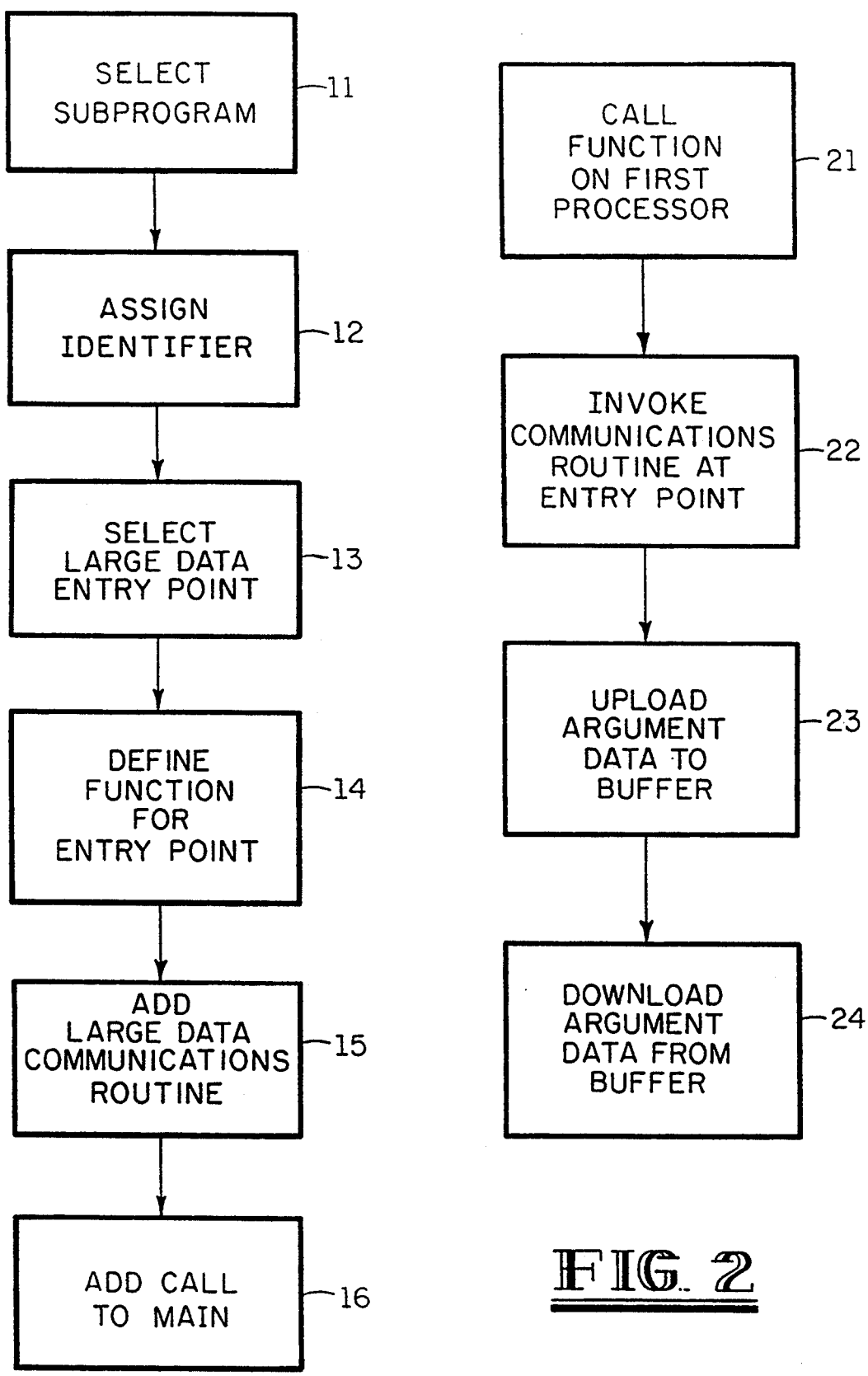

FIRST PROCESSOR FOR DIVIDING LONG ARGUMENT DATA INTO PACKETS AND STORING TOTAL PACKET COUNT AND PACKETS IN SHARED BUFFER FOR SUBSEQUENT EXECUTION BY SECOND PROCESSOR

This application is a continuation of application Ser. No. 07/420,440, filed Oct. 12, 1989 now abandoned.

TECHNICAL FIELD OF THE INVENTION

This invention generally relates to computer processing, and more particularly to a method, used with a multiprocessor system, of calling a software function from a program running on a first processor but executed by a second processor.

BACKGROUND OF THE INVENTION

An important development in computer processing has been systems having more than one processor, each capable of independent action to execute applications programming. Different program tasks may be assigned to different processors, with the result that the execution time of the programming is substantially reduced. One approach to dividing tasks in a multiprocessor system is designating subprograms, which link into a main program running on a first processor, for execution by a second processor.

Where designated subprograms are to be executed by a second processor, a problem with implementing such a division of tasks is that the second processor needs certain information about the subprograms passed to it. Because of the difficulty in programming a solution to this problem, some multiprocessor systems have a second processor whose functions are fixed. The user cannot add new functions and is limited to the functions provided with the processor.

In other multiprocessor systems, a programmer may add functions, but must either create a support routine to permit the second processor to receive the function, or use a nonstandard format when defining the function. For this reason, regardless of whether the programmer wrote his or her own function definitions or obtained pre-written function definitions from another, substantial programming effort is required to ensure that the added function would operate in the multiprocessor system.

Thus, a need exists for a multiprocessor system in which functions are extensible. The programmer should not be limited to using only a set number of functions that the second processor is capable of understanding and should be able to add functions to be executed by the second processor with a minimum of programming effort.

One response to this need has been the use of a "generic entry point" method. A number of entry point commands are provided, each associated with certain characteristics of function arguments and return values, if any. Each entry point command invokes an associated communications routine that handles the transfer, from one processor system to another, of the particular argument format and return requirements of that entry point command. Typically, the communications routine uses a communications buffer accessible by both processors to transfer data. Yet, when the buffer has a fixed size, a need exists to handle situations in which the size of the argument data exceeds the size of the buffer.

SUMMARY OF THE INVENTION

All aspects of the invention deal with programming for a multiprocessor system, which has a first processor for running a main application program that calls designated functions to be executed by a second processor. The functions called by the first processor and executed by the second processor are referred to as "extended functions". One aspect of the invention is a method of programming an extended function that has an argument that requires a large amount of data. The function is redefined with a special entry point command, which is associated with a particular argument format, and which invokes an associated communications routine. The communications routine transfers the argument data from one processor to another by using a communications buffer as a circular queue to transfer the data in packets.

Another aspect of the invention is a method of programming an extended function that may include both a first argument that requires a small amount of data and a second argument that requires a large amount of data. The function is redefined with a special entry point, which is associated with a particular argument format as well as with a certain communications routine. The communications routine handles the transfer of the data from one processor to another by first transferring the small argument data, then using a service routine, which transfers the large argument data in bursts.

Another aspect of the invention is a method of using a multiprocessor computer system to call a function on one processor and execute that function on another processor. The computer is programmed to provide a means for passing large amounts of argument data, so that at run time, a memory space such as a communications buffer is used to pass the argument data in bursts. In a first embodiment, the buffer is used as a circular queue to pass the data in packets. In a second embodiment, small argument data as well as large argument data may be transferred. The small data is sent to a buffer at one time, but a service routine transfers the large data to the buffer in bursts.

Another aspect of the invention is a computer system that per,nits functions called from a main program running on one processor to be executed by a second processor. Each one of a set of entry points is associated with various function properties. Each entry point is also associated with a communications routine that enables the processors to exchange values for function arguments and return values, if any. These communications routines include routines especially designed to handle function arguments that require large amounts of data.

A technical advantage of the invention is that a function having a large amount of argument data can be used as an extended function in a multiprocessor computer system. The extended function is associated, via an entry point, with special communications programming that permits processing by the second processor to commence even while data is still being downloaded. Thus, rather than transferring data from the memory of the first processor to the second and then invoking a command for execution by the second processor, the communications programming permits parallelism.

BRIEF DESCRIPTION OF THE DRAWINGS

The novel features of the invention are set forth in the appended claims. The invention itself, however, as well as modes of use and further advantages, is best understood by reference to the following description of illustrative embodiments when read in conjunction with the accompanying drawings.

FIG. 1 is a flow diagram of the steps of the method of programming an extended function that has an argument that requires a large amount of data.

FIG. 2 is a flow diagram of the steps of the method of using a multiprocessor system to run a program on a first processor, which calls functions executed by a second processor.

DETAILED DESCRIPTION OF THE INVENTION

Figure 3:
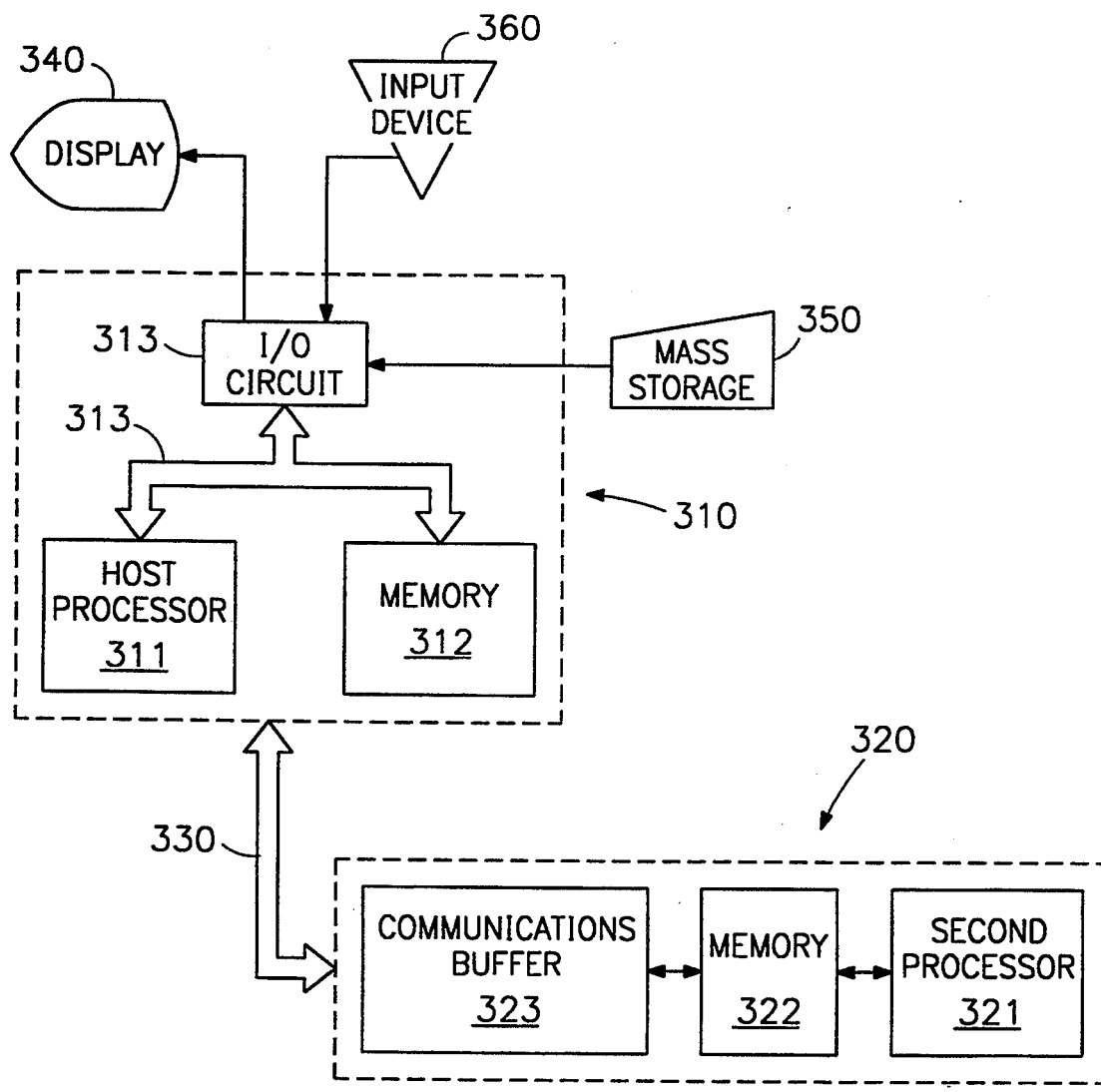
FIG. 3 is a block diagram of a multiprocessor system typical of a system with which the invention is used.

A portion of the disclosure of this patent document contains material that is subject to copyright protection. The copyright owner has no objection to the facsimile reproduction by anyone of the patent disclosure, as it appears in the Patent and Trademark Office files or records, but otherwise reserves all copyright rights whatsoever.

For purposes of this description, a subprogram that a user might desire to add to a multiprocessor system, is referred to as an "extended function". More specifically, an extended function is a function that is to be called by a main program running on a first processor of a multiprocessor system, but executed by a second processor. The system running the main program is referred to as the "host processor system" or "host system". The system on which the extended function is to be executed is the "subprocessor system" or "subsystem".

It is assumed that the multiprocessor system has a communications system for handling the passing of data between processors. Hardware features of the multiprocessor system, including the communications system, are discussed below, in connection with FIG. 3.

The description of the invention is primarily directed to implementation of the invention with programs written in the C programming language. However, the programming environment in which the invention will operate is not unique to C. Some common programming language characteristics are described below, both for definitional purposes, and for the purpose of setting out those characteristics that permit the invention to be used with other languages.

The "user" of the invention may be various persons who provide parts of a multiprocessor system. For example, the user may be a programmer who wishes to use extended functions in a program. Or, the user may be a programmer who supplies extended functions for use by other programmers. The user may be someone actually running a program having extended functions. Furthermore, the invention may be made or sold by any one of these users. The various aspects of the invention discussed below are directed to different users and different physical embodiments of the invention. Finally, as is characteristic of computer methods and programs, the user may be another program which calls an extended function.

In a copending U.S. patent application Ser. No. 08/25,910 entitled "Extended Software Functions for a Multiprocessor System", also assigned to Texas Instruments, Inc., filed Mar. 3, 1993, still pending, a continuation of U.S. patent application Ser. No. 07/419,999 filed Oct. 11, 1989 and now abandoned, and incorporated by reference, a method is described for using special entry points for communicating the argument data of extended functions. This application is referred to herein as "the copending application".

As in the copending application, this invention is directed to extended functions, which are functions that are called by a program running on a first processor of a multiprocessor system but are executed by a second processor. The entry point is to a communications routine that handles that function's particular argument format. Generally, when an extended function is called, a communications routine handles the transfer of its argument data from host memory into a memory area of the second processor. For purposes of this description, that memory area is referred to as a communications buffer. If the buffer has a fixed size, it is easy for an extended function having a large amount of argument data to overflow this buffer.

A basic concept of this invention is that special entry points may be also used to invoke communications programming to accommodate data that would otherwise overflow the communications buffer. The argument data for which the invention is directed is referred to herein as "large argument data" or "poly data" to distinguish it from argument data that is "small" and will not overflow the buffer.

The invention has two embodiments, whose use depends on whether the extended function passes only large data, or small, as well as large data. The embodiment associated with the first situation is referred to herein as the "poly embodiment", and the embodiment associated with the second situation is referred to as the "immediate-poly embodiment".

FIG. 1 illustrates a method of programming an extended function in accordance with the two embodiments of the invention. Generally, the steps of the method are the same as for the above referenced copending application, except that the implementations are different because of the nature of the argument data.

Thus, in step 11, a subprogram is selected for execution on the second processor. In this invention, the subprogram is a function that requires a large amount of argument data.

Step 12 is assigning an identifier to the extended function, which, as in the copending application, permits the user to add more than one extended function, by identifying the function to both processor systems. Thus, the identifier provides a means for selecting the proper extended function to be executed at run time.

In step 13, the user selects an entry point command from a number of entry points commands recognized by the communications system. As discussed above, these entry point commands include commands that invoke a communications routine that handles the transfer of large argument data between processors. Here, the implementation of step 13 varies according to which embodiment of the invention is used. The entry point command is common to both the entry point code in the subprogram and its call in the main program. The entry point command's arguments are the extended function's identifier and information about its arguments.

The following examples are representative implementations of entry point commands, in accordance with the invention, shown in C language syntax. In each of the entry point command arguments, the "cmd_number" is the function identifier discussed above in connection with step 12.

The poly embodiment is used when the argument contains only large data, and no small data. An entry point command invokes a communications routine that uses a buffer as a circular queue of packets to download the argument data to the subprocessor. The form of the entry point, herein referred to as a poly entry point command, is:

```
void poly (cmd_number, packet_number, /
    packet_size, packet_ptr)
    short      cmd_number;
    short      packet_number;
    short      packet_size;
    char far   *packet_ptr;
```

A second implementation of step 13 is the immediate-poly embodiment of the invention, which is used when small argument data, as well as large data, are to be passed to the second processor. The form of the entry point command, herein referred to as an ipoly entry point command, is:

```
void ipoly (cmd_number, nShorts, sData, /
    ..., ItemSz, nItems, pData)
    unsigned short      cmd_number;
    unsigned short      nShorts;
    unsigned short      sData;
    .
    .
    .
    unsigned short      ItemSz;
    unsigned short      nItems;
    char far            *pData;
```

An explanation of each argument is:

| | |
|---|---|
| cmd_number | command number |
| nShorts | number of immediate short words to send |
| sData | short word of data to send |
| ItemSz | size of items that follow (in bytes) |
| nItems | number of items that follow |
| *pData | pointer of data to send |

Step 14 is defining the extended function's arguments consistent with the selected entry point command. For the poly embodiment, the argument data is parameterized with an argument that represents the large data. For the immediate-poly embodiment, the argument data is parameterized with an argument for the small data and an argument for the large data. If more than one of each of such arguments is desired, all steps of the invention can be easily modified to accommodate corresponding parameterization.

Step 15 is adding special communications programming at an entry point associated with the entry point command to handle the transfer of the extended function's argument data. Again, this communications programming varies according to the embodiment of the invention being used. Appendices A and B are examples of programming in accordance with the poly embodiment of the invention. Appendices C-E are examples of programming in accordance with the immediate-poly embodiment. These appendices are further explained below in connection with the run time aspects of the invention. Table 1 explains the instructions used in Appendices B, C and E.

Step 16 is adding a function call to the main program. For the poly embodiment, the call has the general form:

```
poly (cmd_number, packet_number, \
    packet_size, packet_ptr);
```

For the immediate-poly embodiment, using the example of Appendix B, the call of polypixel in the host program would appear as:

```
ipoly (cmd_number, 2, color, rop, 4, \
    nPoints, pData)
``` where the arguments represent the following information:

| | |
|---|---|
| cmd_number | command number of function |
| 2 | specifies that two immediate arguments follow |
| color | the first immediate argument |
| rop | the second immediate argument |
| 4 | each item is a point, which in this case is two words, or 4 bytes. The first word is an x coordinate; the second word is a y coordinate. |
| nPoints | Specifies the number of points to be sent |
| pData | A pointer in memory of first processor where the point data resides. |

A means for invoking the entry point command upon calling the extended function is required, which in the preferred embodiment is accomplished with a processor that directs the programming to the entry point when the function is called.

FIG. 2 illustrates a run time aspect of the invention, which is a method of using a multiprocessor computer system to execute a single program having at least one extended function. The basic steps are similar to the basic steps of the copending application. As explained below in connection with steps 23 and 24, however, the implementations of these steps do not simply transfer argument data from one memory to another and require additional communications programming to monitor the transfer of data in blocks.

The method of FIG. 2 is for use on a multiprocessor system having a communication means. FIG. 2 is best understood with reference to FIG. 3, which is a block diagram of a computer system having both a host processor system 310 and a subprocessor system 320. Processors 311 and 321 each have their own memory, 312 and 322. A communication means between the two processors is embodied by bus 330 and communications buffer 323. Bus 330 is bidirectional and provides a sixteen bit data path and nine control lines. Communications buffer 323 can be accessed by both processor systems 310 and 320. In the preferred embodiment, communications buffer 323 is a storage structure, having separate locations for host messages and subprocessor messages and other data. Other hardware implementations of a communications storage means are possible, with the primary requirement being that each processor 311 and 321 have access to memory space, including parameter space for handshaking between processors, function identification space to identify the function being called, and data space to pass command arguments and additional data.

The configuration shown in FIG. 3 is only one of numerous means for providing interprocessor communications, and other means are easily developed. Furthermore, although FIG. 3 shows the two processor systems, 310 and 320, as having separate memories 312 and 322, the communications means may be a shared memory.

The multiprocessor system of FIG. 3 operates with various standard peripheral devices, notably a display 340, mass storage 350, and input devices 360, such as a keyboard or mouse. An I/O circuit 313 is used to communicate information in appropriate form between these input and output devices and the other parts of host system 310, via a host system bus 314. Display 340 and input devices 360 permit a user to interact with the host processor system 310. If subprocessor system 320 is used for graphics tasks, display 340 may be coupled to processor 321 rather than to host system 310.

Referring again to FIG. 2, step 21 is calling an extended function. As indicated above, the initial call is from a main program running on host processor system 310, but the extended function definition resides in memory 322 of subprocessor system 320. The call must be directed to subprocessor system 320. Thus, in step 21, the call in the main program directs the host processor to an entry point of communications programming, the latter being programmed to transfer data consistent with the properties of the function. In the C language embodiment, the call may be in the form of the preprocessor function calls described above in connection with step 16 with FIG. 1. This syntax is especially useful in the preferred embodiment, for redefining the function call as a call to the entry point, using an entry point command.

Step 22 is initiating communications between the two processor systems 310 and 320. This step involves using the communications programming and communications buffer 323 to perform handshaking routines. These handshaking routines are known in the art, and includes the passing of messages to indicate busy, idle, or message waiting conditions. Although, as indicated above, the memory space used to exchange data between processors is described herein as a communications buffer 323, any mutually accessible form of memory space could be used. Step 23 is loading the extended function's identifier and its argument data into communications buffer 323, using communications programming invoked at the entry point and executed by the host. However, a feature of the invention is that large argument data is not loaded at one time.

Figure 4:
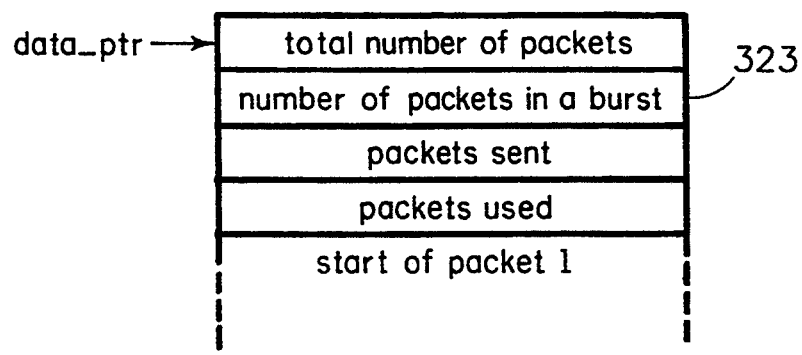
FIG. 4 illustrates a communications buffer, such as is illustrated in FIG. 3.
Figure 5:
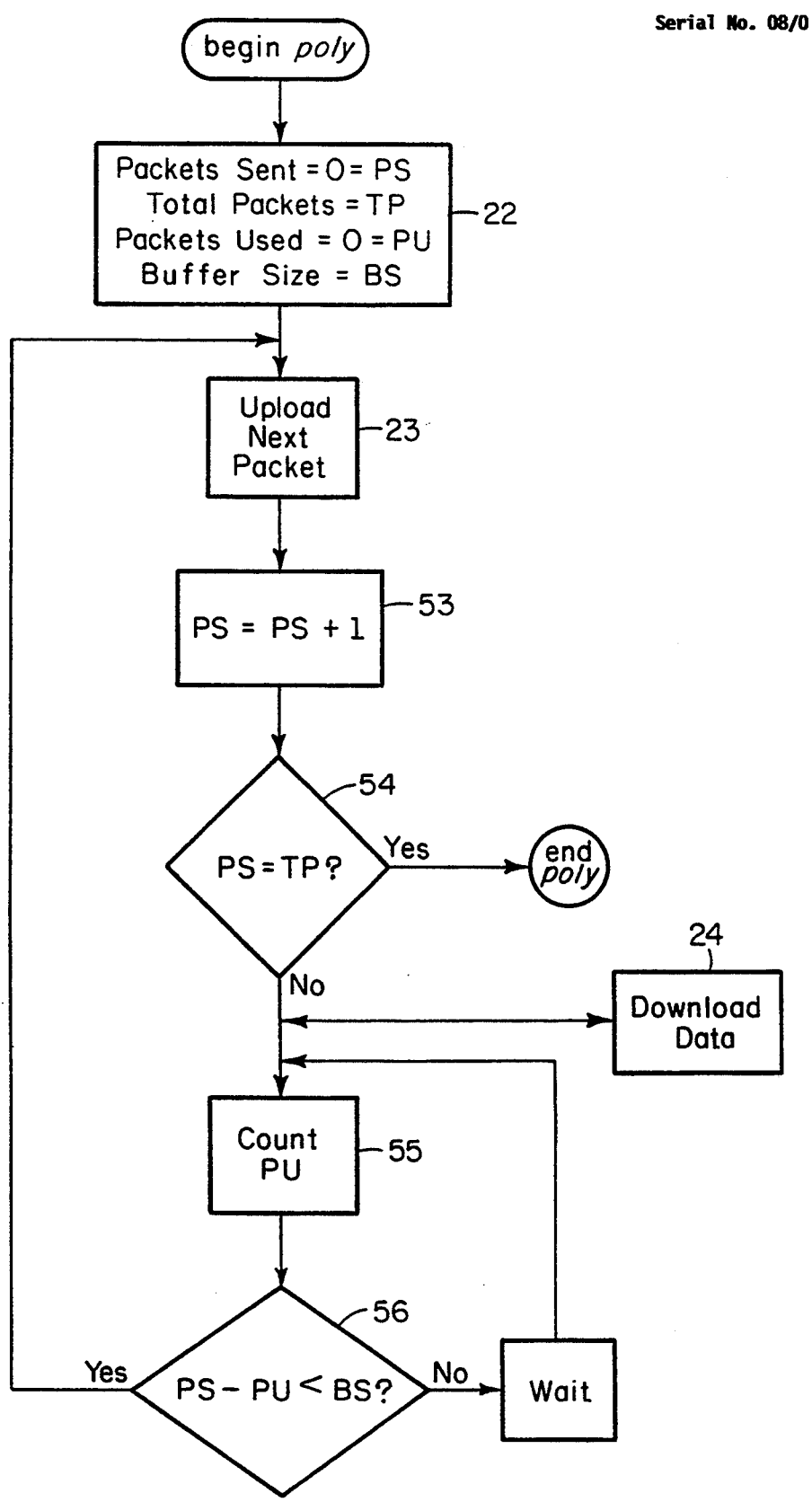
FIG. 5 is a flow diagram of the run time method of using a multiprocessor computer system to execute an extended function, in accordance with the large data embodiment of the invention.

FIGS. 4 and 5 illustrate steps 22-24 of the poly embodiment of the invention in more specific detail. Generally, the extended function is associated with a communications routine that transfers the large data in bursts. FIG. 4 illustrates a buffer during run time and FIG. 5 illustrates the steps of the communications routine.

Referring to FIGS. 4 and 5, in step 22, the communications routine is invoked, such that certain values used by the communications routine are initialized. Specifically, values representing the total number of packets, TP, and the buffer size, BS, are obtained. Values representing the number of packets sent to the buffer, PS, and the packets downloaded from the buffer, PU, are set to zero.

In step 23, a packet of large data is uploaded to buffer 323. In step 53, the packets sent count is updated. In step 54, this count is compared to the total number of packets to be transferred. If the packets sent count is equal to the total number of packets to be transferred, the routine ends.

As indicated by FIG. 5, concurrently with step 23, step 24 is downloading the data from buffer 323 to memory 322 of the second processor system 320. In step 24, the data is removed from the buffer and matched with local variables of the extended function residing in the second processor system memory 322.

Step 55 is obtaining a packets used count. Step 56 is subtracting the packets used count from the packets sent count to ensure that there is enough room in buffer 323 to download more packets. If there is sufficient room, step 23 is repeated. If there is not sufficient room, the routine waits for step 24 to download more data. As indicated in FIG. 5, this process is repeated until all packets have been transferred.

An example of computer code to implement the steps of FIG. 5 is set out in Appendices A and B. Appendix A illustrates the steps performed by host processor 311, which are the steps of FIG. 5 except for step 24. Appendix B illustrates step 24. The example is a shell routine, in which the poly call set out above in connection with Step 16 of FIG. 1, is implemented as dm_poly.

Figure 6:
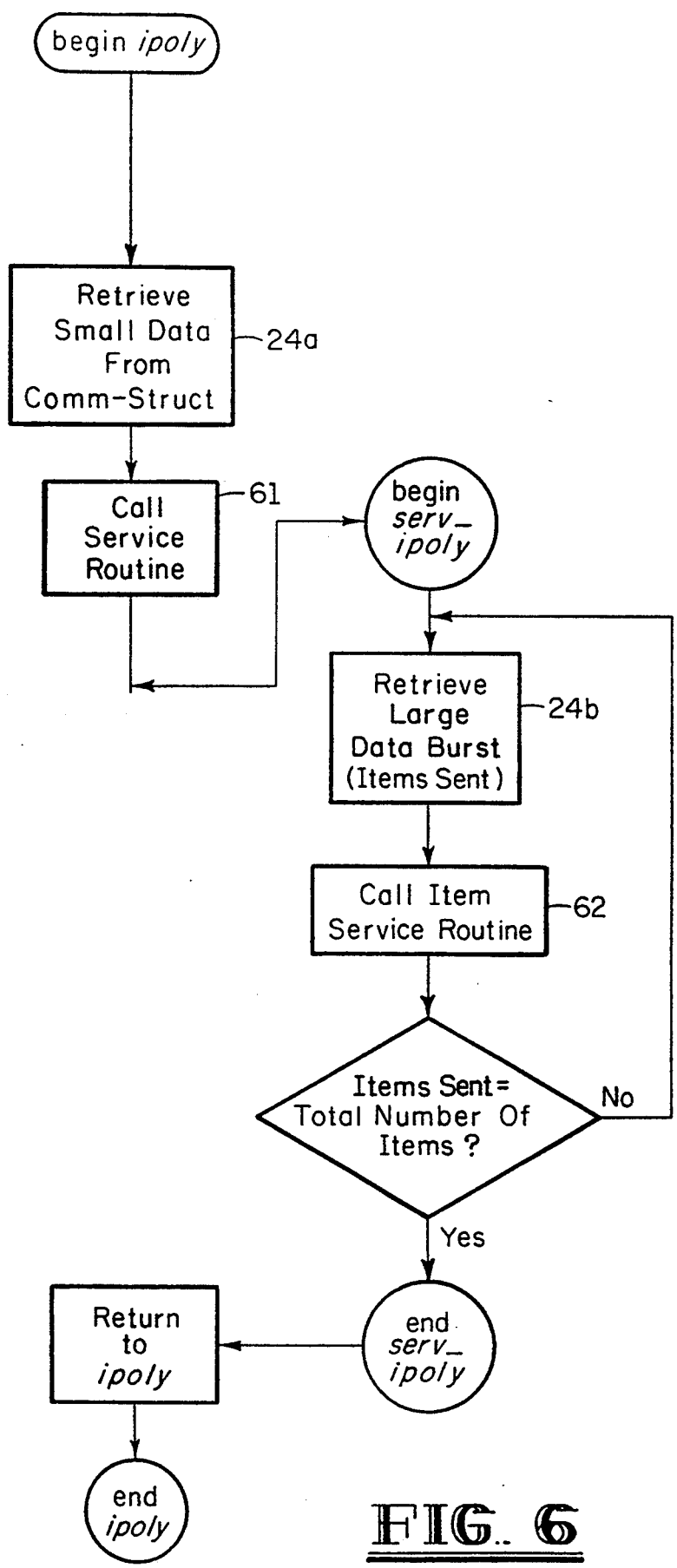
FIG. 6 is a flow diagram of the run time method of using a multiprocessor computer system to execute an extended function, in accordance with the small and large data embodiment of the invention.

FIG. 6 illustrates steps 24 and 25 of the immediate-poly embodiment of the invention in further detail. As indicated in FIG. 6, these uploading and downloading steps actually occur twice: once for the small data and once for the large data.

Step 24a occurs after the extended function is called, and comprises generating a data pointer in memory 322 of the second processor system 320. The data at that address consists of the immediate data values, which in step 24a, are downloaded to local memory of the second processor system 320.

Step 61 is calling a service routine that processes the poly data and supplies a communications protocol. The use of a service routine is preferred to isolate these tasks from the extended function. The service routine has the following parameters:

```
srv_ipoly (pItemSrv, pDataBuf)
    void (*pItemSrv) ( );
    char *pDataBuf;
```

The pItemSrv is the address of a function that will in turn be called by srv_ipoly to handle one or more items. This function will be called repeatedly by srv_ipoly until all the items have been received by the second processor and serviced, and has the following parameters:

```
(*pItemSrv) (nItems, pItems);
    unsigned short    nItems;
```

-continued

```
char *pItems;
``` where nItems is the number of items requiring service and pItems is the address of a data buffer containing nItems of data.

Referring again to the parameters of srv_ipoly, pDataBuf is the address immediately following the last immediate word received by the extended function. Thus, part of step 61 is passing an address of the large data to the second processor system 320, specifically, to a service routine.

An example of computer code to implement the steps of FIG. 6 is set out in Appendices C-E. Appendix C is an example of a user function that is called using the immediate-poly entry point, which is dm_ipoly in the example. The user function, polypixel, is a graphics function that draws specified pixels on a display screen. It has two immediate arguments: the foreground color of the pixel and the raster op to be used to draw the pixels. The remaining data is poly data, more specifically, an array of points where pixels are to be drawn. The code for the ipoly entry point, which is executed by processor 311, is set out in Appendix D. In general, the poly data is retrieved by a callback communication service routine, which is turn called drawpixels until the received poly data is exhausted.

Thus, referring to FIG. 6, with reference to Appendix E, the user function is called with a pointer to the communication buffer 323 where the small (immediate) data exists. In step 24a, the user function retrieves and uses this data as necessary. In step 61, the function calls a standard service routine to process the receiving of large (poly) data. This service routine is called srv_ipoly, and executed by processor 321. The srv_ipoly routine provides the communications, and, as in step 24b of FIG. 6, retrieves data items from host system 310 in bursts. Consistent with step 62, once a burst has been received, an item service routine, whose address was specified by the user function as an argument to srv_ipoly is called to service those received items. A pointer to the received data items and the length of the data (number of items) are passed to this item service routine. This process is then continued until all items have been received and serviced.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

APPENDICES

The disclosure of this patent application incorporates the attached appendices, which are summarized as follows:

Appendices A and B are an example of the computer code to implement the poly embodiment of the invention.

Appendices C-E are an example of computer code to implement the immediate-poly embodiment of the invention.

Table 1 explains the instructions used in Appendices B, C and E, which are used with a 340 family of processors manufactured by Texas Instruments Inc. The instructions of Appendices A and D are for a host processor such as one of the 80** family manufactured by Intel Corp.

TABLE 1

| | |
|---|---|
| ABS Rd | Store Absolute Value |
| | Operation: Rd! → Rd |
| | Store the absolute value of the specified register back into the register. |
| ADD Rs, Rd | Add Registers |
| | Operation: Rs + Rd → Rd |
| | Add the contents of the source register to the contents of the destination register. |
| ADDC Rs. Rd | Add Registers with Carry |
| | Operation: Rs + Rd + C → Rd |
| | Add the contents of the source register and the carry bit to the contents of the destination register. |
| ADDI IW. Rd. [W] | Add Immediate - Short or Long |
| ADDI IL. Rd. [L] | Operation: Immediate value + Rd → Rd |
| | Add an immediate value to the contents of the destination register. In the short form, the operand is a 16-bit sign-extended value. In the long form, the operand is a 32-bit signed value. You can force the assembler to use the short (16-bit) form of this instruction by using the W operand. You can force the assembler to use the long (32-bit) form of this instruction by using the L operand. |
| ADDK K, Rd | Add Constant (5 Bits) |
| | Operation: K + Rd → Rd |
| | Add a 5-bit constant to the contents of the destination register. The constant K is treated as an unsigned number in the range 1–32: K = 32 is converted to 0 in the opcode. The assembler issues an error if you try to add 0 to a register. |
| CALLA Address | Call Subroutine - Absolute |
| | Operation: |
| | PC' → TOS |
| | Address → PC |
| | The assembler pushes the address of the next instruction (PC') onto the stack then jumps to the specified 32 bit address. |
| CALLR Address | Call Subroutine - Relative |
| | Operation: |
| | PC' → TOS |
| | PC + (displacement × 16) → PC |

TABLE 1-continued

| | |
|---|---|
| | The assembler pushes the address of the next instruction (PC') onto the stack, then jumps to the address specified by PC + displacement. The address must be within the current section. |
| CLR Rd | Clear Register |
| | Operation: Rd XOR Rd → Rd |
| | Set the contents of the register to 0 |
| CMP Rs, Rd | Compare Registers |
| | Operation: set status bits on the result of Rd − Rs |
| | Set the status bits as if the contents of the source register were subtracted from the contents of the destination register. This is a nondestructive compare - the register contents do not change. |
| CMPI IW.Rd.[W] | Compare Immediate - Short or Long |
| CMPI IL.Rd.[L] | Operation: set status bits on the result of Rd - immediate value |
| | Set the status bits as if an immediate value were subtracted from the contents of the destination register. This is a nondestructive compare - the register contents do not change. CMPI is used with conditional jumps. In the short form, the operand is a 16-bit sign-extended value. In the long form, the operand is a 32-bit signed value. |
| | You can force the assembler to use the short (16-bit) form of this instruction by using the W operand. You can force the assembler to use the long (32-bit) form of this instruction by using the L operand. |
| DSJ Rd. Address | Decrement Register and Skip Jump - Short or Long |
| DSJS Rd. Address | Operation: |
| | Rd − 1 → Rd |
| | If Rd ≠ 0, then (displacement × 16) + PC' → PC |
| | If Rd = 0, then go to next instruction |
| | Decrement the contents of the destination register by 1. |
| | If the results is nonzero, then jump to the address specified by (displacement × 16) + PC. |
| | If the result is 0, then skip the jump and continue execution at PC. |
| | This instruction has a short form and a long form. The assembler automatically chooses the short form if the displacement is ±5 bits or less which provides a jump range of 32 words (excluding 0). The assembler automatically chooses the long form if the displacement is greater than 5 bits, which provides a jump range of 32,768 to 32,767. |
| JRcc Address | Jump Relative conditional |
| | Operation: |
| | If cc = true, then displacement + PC' → PC |
| | If cc = false, then go to next instruction. |
| | If the conditions is true, jump to the address specified by displacement + PC'. If the condition is false, continue execution at PC'. cc is the condition code. |
| | This instruction has a short form and a long form. The assembler automatically chooses the short form if the displacement is 8 bits or less. This provides a jump range of ±127 words (excluding 0). The assembler automatically chooses the long form if the displacement is greater than 8 bits. This provides a jump range of ±32K words (excluding 0). |
| MMFM Rs[, reg. list] | Move Multiple Registers from Memory |
| | Operation: |
| | If Register n is in the register list. |
| | *Rs− → Rn (repeat for n = 0 to 15) |
| | Load the contents of a specified list of either A or B registers (not both) from a block of memory. Rs points to the first location in the memory block; Rs and the registers in the list must be in the same file. If you don't specify a register list, all the registers that are in the same file as Rs are moved. |
| MMTM Rd[, reg. list] | Move Multiple Registers to Memory |
| | Operation: |
| | If Register n is in the register list |
| | Rn → −*Rd (repeat for n = 0 to 15) |
| | Store the contents of a specified list of either A or B registers (not both) into a block of memory. Rd points to the first location in the memory block; Rd and the registers in the list must be in the same file. If you don't specifiy a register list, all the registers that are in the same file as Rd are moved. |
| MOVE Rs, Rd | Move - Register to Register |
| | Operation: Rs → Rd |
| | Move the contents of the source register into the destination register. It is not necessary for the registers to be in the same file. |
| MOVE Rs, *Rd [.F] | Move Field - Register to Indirect |
| | Operation: field in Rs → field in *Rd |
| | Move a field from the source register into a memory location specified by the contents of the destination register. |
| MOVE Rs, *Rd+ [.F] | Move Field - Register to Indirect (Postincrement) |
| | Operation: |

TABLE 1-continued

| | |
|---|---|
| | field in Rs → field in *Rd<br>Rd + field size → Rd<br>Move a field from the source register into a memory location specified by the contents of the destination register. After the move, increment the contents of Rd by the field size. |
| MOVE Rs, —*Rd [.F] | Move field - Register to Indirect (Predecrement)<br>Operation:<br>Rd — field size → Rd<br>field in Rs → field in *Rd<br>Decrement the contents of Rd by the field size. Move a field from the source register into a memory location specified by the contents of the destination register. |
| MOVE Rs, *Rd(offset) [.F] | Move Field - Register to Indirect with Offset<br>Operation: field in Rs → field in * (Rd + offset)<br>Move a field from the source register into a memory location. The destination address is formed by adding an offset to the contents of the destination register. |
| MOVE Rs, @DAddress [.F] | Move Field - Register to Absolute<br>Operation: field in Rs → field in memory<br>Move a field from the source register into the specified destination address. |
| MOVE *Rs, Rd [.F] | Move Field - Indirect to Register<br>Operation: field in *Rs → field in Rd<br>Move a field from contents of a memory address into the destination register. The source address is specified by the contents of the source register. |
| MOVE *Rs, *Rd [.F] | Move Field - Indirect to Indirect<br>Operation: field in *Rs → field in *Rd<br>Move a field from the contents of a memory address into another memory address. The source address is specified by the contents of the source register, and the destination address is specified by the contents of the destination register. |
| MOVE *Rs+, Rd [.F] | Move Field - Indirect (Postincrement) to Register<br>Operation:<br>field in *Rs → field in Rd<br>Rs + field size → Rs<br>Move a field from the contents of a memory address into the destination register. The source address is specified by the contents of the source register. After the move, increment the contents of the source register by the field size. |
| MOVE *Rs+, *Rd+ [.F] | Move Field - Indirect (Postincrement) to Indirect (Postdecrement)<br>Operation:<br>field in *Rs → field in *Rd<br>Rs + field size → Rs<br>Rd + field size → Rd<br>Move a field from the contents of a memory address into another memory address. The source address is specified by the contents of the source register, and the destination address is specified by the contents of the destination register. After the move, increment the contents of both the source register and the destination register by the field size. |
| MOVE —*Rs, Rd [.F] | Move Field - Indirect (Predecrement) to Register<br>Operation:<br>Rs — field size → Rs<br>field in *Rs → field in Rd<br>Decrement the contents of the source register by the field size. Move a field from the contents of a memory address into the destination register. The source address is specified by the contents of the source register. |
| MOVE —*Rs, Rd [.F] | Move Field - Indirect (Predecrement) to Indirect (Predecrement)<br>Operation:<br>Rs — field size → Rs<br>Rd — field size → Rd<br>field in *Rs → field in *Rd<br>Decrement the contents of both the source register and the destination register by the field size. Move a field from the contents of a memory address into another memory address. The source address is specified by the contents of the source register and the destination address is specified by the contents of the destination register. |
| MOVE *Rs(offset), Rd [.F] | Move Field - Indirect with Offset to Register<br>Operation: field in *(Rs — offset) → field in Rd<br>Move a field from the contents of a memory address into the destination register. The source address is formed by adding an offset to the contents of the source register. |
| MOVE *Rs(offset), *Rd+ [.F] | Move Field - Indirect with Offset to Indirect (Postincrement)<br>Operation: field in *)Rs + offset) → field in (Rd<br>Move a field from the contents of a memory address into the destination register. The source address is formed by adding an offset to the contents of the source register. After the move, increment the contents of the destination register by the field |

TABLE 1-continued

| | |
|---|---|
| | size. |
| MOVE *Rs(offset), *Rd(offset) [.F] | Move Field - Indirect with Offset to Indirect with Offset<br>Operation: field in *(Rs + offset) → field in *(Rd + offset)<br>Move a field from the contents of a memory address into another memory address. The source address is formed by adding an offset to the contents of the source register, and the destination address is formed by adding an offset to the contents of the destination register. |
| MOVE @SAddress, Rd [.F] | Move Field - Absolute to Register<br>Operation: field in source address → field in Rd<br>Move a field from the contents of the specified memory address into the destination register. |
| MOVE @SAddress, *Rd+ [.F] | Move Field - Absolute to Indirect (Postincrement)<br>Operation:<br>field in source address → field in *Rd<br>Rd + field size → Rd<br>Move a field from the contents of the specified source address into the memory address specified by the contents of the destination register. After the move, increment the contents of the destination register by the field size. |
| MOVE @SAddress, @DAddress [.F] | Move Field - Absolute to Absolute<br>Operation: field in source address → field in destination address<br>Move a field from the contents of the specified source address into the specified destination address |
| MOVI IW. Rd[W]<br>MOVI IL. Rd.[Ll] | Move Immediate - Short or Long<br>Operation: Immediate operand → Rd<br>Move an immediate value into the destination register. In the short form, the operand is a 16-bit sign-extended value. In the long form, the operand is a 32-bit signed value.<br>You can force the assembler to use the short (16-bit) form of the instruction by using the W operand. You can force the assembler to use the long (32-bit) form of this instruction by using the L operand. |
| MOVK K, Rd | Move Constant - 5 Bits<br>Operation: K → Rd<br>Move a 5-bit constant into the destination register. Note that this instruction does not affect the status register. |
| MPYS Rs. Rd | Multiply Registers - Signed<br>Operation:<br>Rd even: Rs × Rd → Rd;Rd + 1<br>Rd odd: Rs × Rd → Rd<br>Perform a signed multiply of a field in the source register by the 32-bit contents of the destination register. This produces a 32-bit to a 64-bit result, depending on the register and the field definition. |
| PIXBLT XY, L | Pixel Block Transfer - XY to Linear<br>Operation: source pixel array → destination pixel array (with processing).<br>Transfer and process a source pixel array with a destination pixel array according to the selected graphics operations. The starting address of the source array is an XY address, the starting address of the destination array is a linear address. |
| PIXBLT XY, XY | Pixel Block Transfer - XY to XY<br>Operation: source pixel array → destination pixel array (with processing).<br>Transfer and process a source pixel array with a destination pixel array according to the selected graphics operations. The starting addresses of the both arrays are XY addresses. |
| PIXT Rs, *Rd | Pixel Transfer - Register to Indirect<br>Operation: pixel in Rs → pixel in *Rd<br>Transfer a pixel from the source register to the linear address specified by the contents of the destination register. |
| PIXT Rs, *Rd.XY | Pixel Transfer - Register the Indirect XY<br>Operation: pixel in Rs → pixel in *Rd.XY<br>Transfer a pixel from the source register to the XY address specified by the contents of the destination register. |
| PIXT *Rs, Rd | Pixel Transfer - Indirect to Register<br>Operation: pixel in *Rs → pixel in Rd<br>Transfer a pixel from a linear address to the destination register. The source address is specified by the contents of the source register. |
| PIXT *Rs, *Rd | Pixel Transfer - Indirect to Indirect<br>Operation: pixel in *Rs → pixel in *Rd<br>Transfer a pixel from a linear address to another linear address. The source address is specified by the contents of the source register, and the destination address is specified by the contents of the source destination register. |
| PIXT *RS.XY, Rd | Pixel Transfer - Indirect XY to Register<br>Operation: pixel in *Rs.XY → pixel in Rd<br>Transfer a pixel from a XY address to the destination register. The source address is specified by the contents of the source register. |

TABLE 1-continued

| | |
|---|---|
| PIXT *Rs.XY, *Rd.XY | Pixel Transfer - Indirect XY to Indirect XY<br>Operation: pixel in *Rs.XY → pixel in *Rd.XY<br>Transfer a pixel from an XY address to another XY address. The source address is specified by the contents of the source register, and the destination address is specified by the contents of the source destination register. |
| RETS [N] | Return from Subroutine<br>Operation:<br>*SP → PC (N defaults to 0)<br>SP + 32 + 16N → SP<br>Return from a subroutine. Move the program counter from the stack and increment SP by 32 + 16N. If N is not specified, increment the SP by 32. |
| SETF FS, FE [,F] | Set Field Parameters<br>Operation: (FS, FE) → ST<br>Load the values specified for the field size and field extension bits into the status register. The remainder of the status register is not affected. |
| SLL K, Rd | Shift Left Logical - Constant<br>Operation: left-shift Rd by K → Rd<br>Left-shift the contents of the destination register by the value of K. (K specifies a value between 0-31). 0s are left-shifted into the LSBs and the last bit shifted out is shifted into the carry bit. Note that this instruction does not affect the overflow bit. |
| SLL Rs, Rd | Shift Left Logical - Register<br>Operation: left-shift Rd by Rs → Rd<br>Left-shift the contents of the destination register by the value in the 5 LSBs in the source register. (The 5 LSBs of the source register specify a value between 0-31: the 27 MSBs are ignored.) 0s are left-shifted into the LSBs and the last bit shifted out is shifted into the carry bit. Note that this instruction does not affect the overflow bit. |
| SUB Rs, Rd | Subtract Registers<br>Operation: Rd − Rs → Rd<br>Subtract the contents of the source register from the contents of the destination register. |
| SUBK K, Rd | Subtract Constant<br>Operation: Rd − K → Rd<br>Subtract a 5-bit constant from the contents of the destination register. K is an unsigned number in the range 1-32. K-0 in the opcode corresponds to the value 32. |

Key:
Rs - Source register
RsX, Rdx - X half (16 LSBs) of the Rs or Rd
SAddress - 32-bit source address
IW - 16-bit (short) immediate value
Address - 32-bit address (label)
K - 5-bit constant
PC' - Next instruction
Rd - Destination register
RsY, RdY - Y half (16 MSBs) of Rs or Rd
DAddress - 32-bit destination address
IL - 32-bit (long) immediate value
F -
Field select: defaults to 0
F = 0 selects FS0 and FE0
F = 1 selects FS1 and FE1

Appendix A

```
        Title    DMPOLY         Copyright (c) 1988,89 Texas Instruments Inc.
;xxxxxxxxxxxxxxxxxxxxxxxxxxxxxxxxxxxxxxxxxxxxxxxxxxxxxxxxxxxxxxxxxxxxxx
;
;
;   Name:     DMPOLY           Direct Mode Poly Routine
;
;
;xxxxxxxxxxxxxxxxxxxxxxxxxxxxxxxxxxxxxxxxxxxxxxxxxxxxxxxxxxxxxxxxxxxxxx
;
;   Module Functional Description:
;
;             This module contains code for TIGA direct mode callable
;        poly routines that have no return values. The format for the
;        data is as follows:
;
;
;                  Command Number              Word
;                  Number of Packets           Word
;                  Packet Size (Words)         Word
;                  Pointer to Packets          Word
;
;
;xxxxxxxxxxxxxxxxxxxxxxxxxxxxxxxxxxxxxxxxxxxxxxxxxxxxxxxxxxxxxxxxxxxxxx
```

```
                Page
;
;   Public Declarations
;
        Public  _DM_Poly               ; TIGA direct mode poly routine
;
;   External Declarations
;
Code    Segment Byte Public 'CODE'     ; Standard code segment
        Extrn   Exec_Cmd:Near          ; Execute TIGA command       (COM_ROUT)
        Extrn   Next_Buffer:Near       ; Get next buffer routine    (COM_ROUT)
        Extrn   Delay:Near             ; Generic delay routine (ms) (SUPPORT)
Code            Ends                   ; End of code segment
Data    Segment Byte Public 'DATA'     ; Standard data segment
        Extrn   Cmd_BufL:Word          ; Current buffer                 (DATA)
        Extrn   Cmd_BufH:Word          ;           command address      (DATA)
        Extrn   Current_Cmd:Word       ; Current command code           (DATA)
        Extrn   Old_ds:Word            ; Ds prior to driver call        (DATA)
        Extrn   Data_Field:Word        ; Actual data field size         (DATA)
        Extrn   Sent_Low:Word          ; Pointer to                     (DATA)
        Extrn   Sent_High:Word         ;           packets sent value   (DATA)
        Extrn   Used_Low:Word          ; Pointer to                     (DATA)
        Extrn   Used_High:Word         ;           packets used value   (DATA)
        Extrn   Start_Low:Word         ; Pointer to                     (DATA)
        Extrn   Start_High:Word        ;           start packet (Bit)   (DATA)
        Extrn   Current_Low:Word       ; Current packet                 (DATA)
        Extrn   Current_High:Word      ;           data pointer         (DATA)
        Extrn   Packets_To_Send:Word   ; Number of packets to send      (DATA)
        Extrn   Packets_Free:Word      ; Number of packets free         (DATA)
        Extrn   Packets_Page:Word      ; Number of packets per. page    (DATA)
        Extrn   Burst_Page:Word        ; Number of bursts per. page     (DATA)
        Extrn   Burst_Size:Word        ; Burst size in words            (DATA)
        Extrn   Burst_Bits:Word        ; Burst size in bits             (DATA)
        Extrn   Data_Size:Word         ; Actual data size available     (DATA)
        Extrn   Packet_Max:Word        ; Maximum packet size (Words)    (DATA)
Data            Ends                   ; End of the data segment
;
;   Include Files
;
        Include Defs.Inc               ; Include hardware dependent items
        Include Macro.Inc              ; Include macro definitions
        Initialize                     ; Setup the processor options
        Page
;
;   LOCAL Equates
;
PACKETS_BURST   Equ     10h            ; Number of packets per. burst
MAXIMUM_BURST   Equ     10h            ; Maximum number of bursts per. page
BURST_SHIFT     Equ     04h            ; Burst shift count (4 => 16)
PACKET_TOTAL    Equ     10h            ; Total number packets to send offset
PACKET_NUMBER   Equ     20h            ; Number of packets per. page offset
PACKETS_SENT    Equ     30h            ; Number of packets sent so far offset
PACKETS_USED    Equ     40h            ; Number of packets used so far offset
PACKET_DATA     Equ     50h            ; Start of packet data offset
DELAY_TIME      Equ     01h            ; TIGA catch up delay time (1 ms)
COUNT_MASK      Equ     0FFF0h         ; Round down count mask value (16)
ABORT_CODE      Equ     0FFFFh         ; Poly abort code value (-1)
```

```
HEADER_SIZE     Equ     (PACKET_DATA Shr 3) - 2
;
;   Define the local stack frame
;
Stack_Frame     Struc                   ; Define the local stack frame
Saved_BP        Dw      ?               ; Saved BP register value
Ret_Addr        Dd      ?               ; Return address (Far return)
Command_Code    Dw      ?               ; Direct mode command number
Packet_Count    Dw      ?               ; Number of data packets
Packet_Size     Dw      ?               ; Size of data packets (Words)
Packet_Pointer  Dd      ?               ; Pointer to packet data (Far)
Stack_Frame     Ends                    ; End of the local stack frame
;
;       Define the standard code segment
;
Code    Segment Byte Public 'CODE'      ; Standard code segment
        Assume  cs:Code, ds:Data, es:nothing
        Page
```

;*****************************************************************************
;
; Routine Functional Description
;
;       _DM_Poly(Stack_Frame)
;
;               Setup pointer to the stack frame
;               Save the required registers
;               Save the requested command code
;               Call routine to get next free buffer
;               Compute and save actual data size (Words)
;               Compute and save maximum packet size (Words)
;               If packet size is smaller than maximum
;                       Compute and save the burst size (Words)
;                       Compute and save the burst size (Bits)
;                       Compute and save number of bursts per. page
;                       Compute and save number of packets per. page
;                       Send the requested command code
;                       Save and send the total number of packets
;                       Send the number of packets per. page
;                       Get pointer to packet data
;                       Clear packets sent and used fields
;                       Call routine to start TIGA processing
;                       Setup to send entire first page (If necessary)
;                       While more packets left to send (First page)
;                               While more bursts to send
;                                       Increment to location to fill next
;                                       Call routine to send a burst of data
;                                       Decrement the total packet counter
;                                       Decrement the burst per. page counter
;                               EndWhile
;                               While more packets left to send (Next page)
;                                       Setup to send entire next page
;                                       While more bursts to send
;                                               While free count too small
;                                                       Delay a small time (1ms)
;                                                       Get new free size

```
;                                           EndWhile
;                                           Increment to location to fill
;                                           Call routine to send burst
;                                           Decrement total packet counter
;                                           Decrement burst/page counter
;                                       EndWhile
;                                   EndWhile
;                               EndWhile
;                               Zero the return code value (No errors)
;                       Else
;                               Set the abort return code value (-1)
;                       Endif
;                       Restore the required registers
;                       Clear the stack frame
;                       Return control to the caller
;
;       Registers on Entry:
;
;               SS:SP = Pointer to stack frame
;
;       Registers on Exit:
;
;               AX-DX  = Destroyed
;               ES     = Destroyed
;               FL     = Direction flag cleared
;
;xxxxxxxxxxxxxxxxxxxxxxxxxxxxxxxxxxxxxxxxxxxxxxxxxxxxxxxxxxxxxxxxxxxxxxxxxxxx
;
_DM_Poly        Proc    Far             ; Direct mode poly procedure
        push    bp                      ; Setup accessibility
        mov     bp,sp                   ;                      to stack frame
        Save    si,di,ds                ; Save the required registers
        cld                             ; Clear the direction flag
        Setup_ds                        ; Setup access to the data segment
        Setup_IF                        ; Setup interface to GSP
        mov     ax,ss:[bp.Command_Code] ; Get the requested command code
        mov     ds:[Current_Cmd],ax     ; Save the current command code
        call    Next_Buffer             ; Call routine to get next free buffer
;
;       Compute the needed data values
;
        mov     ax,ds:[Data_Field]      ; Get the page data field size (Words)
        sub     ax,HEADER_SIZE          ; Adjust size to accommodate header
        mov     ds:[Data_Size],ax       ; Save the actual data size (Words)
        mov     cl,BURST_SHIFT          ; Get burst count shift value (4 => 16)
        shr     ax,cl                   ; Compute maximum packet size (Words)
        mov     ds:[Packet_Max],ax      ; Save the maximum packet size (Words)
        mov     dx,ss:[bp.Packet_Size]  ; Get the data packet size (Words)
        cmp     dx,ax                   ; Make sure packet smaller than maximum
        jbe     Continue                ; Jump if packet size is valid
        jmp     Abort                   ; Abort the packet data transfer
Continue:
        shl     dx,cl                   ; Compute the burst size (Words)
        mov     ds:[Burst_Size],dx      ; Save the burst size (Words)
        mov     ax,dx                   ; Get the burst size (Words)
        shl     ax,cl                   ; Compute burst size (Bits)
        mov     ds:[Burst_Bits],ax      ; Save the burst size (Bits)
        mov     ax,ds:[Data_Size]       ; Get the maximum data size (Words)
        mov     bx,1                    ; Setup to compute bursts per page
```

```
Try_More:
        shl     dx,1                    ; Try to double the number of bursts
        cmp     dx,ax                   ; Check against the maximum data size
        jg      Got_Size                ; Jump if this double is too much
        shl     bx,1                    ; Double the actual number of bursts
        cmp     bx,MAXIMUM_BURST        ; Check against maximum number of bursts
        jb      Try_More                ; Jump if still room to grow Got_Size:
        mov     ds:[Burst_Page],bx      ; Save actual number of bursts per. page
        shl     bx,cl                   ; Compute number of packets per. page
        mov     ds:[Packets_Page],bx    ; Save the number of packets per. page
        mov     bx,ds:[Cmd_BufL]        ; Get address of
        mov     cx,ds:[Cmd_BufH]        ;              command buffer (8it)
        Write_HSTADDR   cx,bx           ; Setup to write command/data buffer
        mov     ax,ss:[bp.Command_Code] ; Get the requested command code
        Write_HSTDATA   ax              ; Write command code to the buffer
        mov     ax,ss:[bp.Packet_Count] ; Get number of packets to send
        mov     ds:[Packets_To_Send],ax ; Save the total number of packets
        Write_HSTDATA   ax              ; Send the total number of packets
        mov     ax,ds:[Packets_Page]    ; Get the number of packets per. page
        Write_HSTDATA   ax              ; Send the number of packets per. page
        xor     ax,ax                   ; Setup to clear sent and used fields
        Write_HSTDATA   ax              ; Clear the packets sent field
        Write_HSTDATA   ax              ; Clear the packets used field
        call    Exec_Cmd                ; Call routine to start TIGA processing
        mov     si,Word Ptr ss:[bp.Packet_Pointer]
        mov     bx,Word Ptr ss:[bp.Packet_Pointer+2]

;
;       Calculate the pointers to the packet and data fields
;

mov     ax,ds:[Cmd_BufL]        ; Get address of
        mov     cx,ds:[Cmd_BufH]        ;              command buffer (8it)
        add     ax,PACKETS_SENT         ; Compute address
        adc     cx,0                    ;              of packets sent (8it)
        mov     ds:[Sent_Low],ax        ; Save address
        mov     ds:[Sent_High],cx       ;              of packets sent (8it)
        add     ax,10h                  ; Compute address
        adc     cx,0                    ;              of packets used (8it)
        mov     ds:[Used_Low],ax        ; Save address
        mov     ds:[Used_High],cx       ;              of packets used (8it)
        add     ax,10h                  ; Compute address
        adc     cx,0                    ;              of data start (8it)
        mov     ds:[Start_Low],ax       ; Save address
        mov     ds:[Start_High],cx      ;              of data start (8it)
        sub     ax,ds:[Burst_Bits]      ; Setup for first
        sbb     cx,0                    ;              pass increment
        mov     ds:[Current_Low],ax     ; Initialize current
        mov     ds:[Current_High],cx    ;              data address (8it)

;
;       Setup to start sending the data packets
;

xor     di,di                   ; Initialize the number of packets sent
        mov     bp,ds:[Burst_Page]      ; Setup to send the entire first page
Fill_Page:
        mov     ax,ds:[Burst_Bits]      ; Get the burst size in bits
        add     ds:[Current_Low],ax     ; Compute the
        adc     ds:[Current_High],0     ;              next addresss to fill
```

```
Start:
        call    Send_Burst              ; Call routine to send burst data
        sub     ds:[Packets_To_Send],PACKETS_BURST
        ja      More_Packets            ; Jump if no more packets to send
        jmp     Good_Exit               ; Go return to the caller
More_Packets:
        dec     bp                      ; Decrement the burst counter
        jnz     Fill_Page               ; Jump if more burst for this page
;
;       New page, restore the starting address and check for overwriting
;
New_Page:
        mov     ax,ds:[Start_Low]       ; Get starting data
        mov     cx,ds:[Start_High]      ;                       packet address (Bit)
        sub     ax,ds:[Burst_Bits]      ; Setup for first
        sbb     cx,0                    ;                       pass increment
        mov     ds:[Current_Low],ax     ; Initialize current
        mov     ds:[Current_High],cx    ;                       data address (Bit)
        mov     bp,ds:[Burst_Page]      ; Setup to send an entire page
Check_Free:
        mov     ax,ds:[Used_Low]        ; Get the packets
        mov     cx,ds:[Used_High]       ;                       used address (Bit)
        Write_HSTADDR   cx,ax           ; Setup to get the packets used count
        Read_HSTDATA    ax              ; Get the packets used count
        and     ax,COUNT_MASK           ; Round value down to nearest burst
        add     ax,ds:[Packets_Page]    ; Calculate maximum safe value
        mov     ds:[Packets_Free],ax    ; Save the maximum safe value
        cmp     ax,di                   ; Check for space available
        jg      Fill_Ok                 ; Jump if it is ok to do the fill
;
;       TIGA is falling behind, better give it some extra time
;
        mov     cx,DELAY_TIME           ; Setup the TIGA delay time (1 ms)
        call    Delay                   ; Call routine to do the delay
        jmp     Check_Free              ; Keep checking the free space
Fill_Ok:
        mov     ax,ds:[Burst_Bits]      ; Get the burst size in bits
        add     ds:[Current_Low],ax     ; Compute the
        adc     ds:[Current_High],0     ;                       next addresss to fill
        call    Send_Burst              ; Call routine to send burst data
        sub     ds:[Packets_To_Send],PACKETS_BURST
        jbe     Good_Exit               ; Jump if no more packets to send
        dec     bp                      ; Decrement the burst counter
        jz      New_Page                ; Jump if time for a new page
        jmp     Check_Free              ; Go do next burst with space check
Good_Exit:
        xor     ax,ax                   ; Zero the return
        mov     dx,ax                   ;                       code value (Ok)
        jmp     Short Poly_Exit         ; Go return to the caller
Abort:
        mov     ax,ABORT_CODE           ; Get the poly abort
        mov     dx,ax                   ;                       error code (-1)
Poly_Exit:
        Restore si,di,ds                ; Restore the required registers
        pop     bp                      ; Clear the stack frame
```

```
        ret                          ; Return control to the caller
_DM_Poly        Endp                 ; End of the _DM_Poly procedure
        Page
;**************************************************************************
; Routine Functional Description
;       Send_Burst(Data_Pointer, Packets_Sent)
;               Save the required registers
;               Setup the current transfer address
;               Get the number of words to send
;               While more words to send
;                       Get the next data word and send it
;                       Decrement the word counter
;               EndWhile
;               Update the packets sent counter (Host and TIGA)
;               Restore the required registers
;               Return control to the caller
;
;       Registers on Entry:
;               DS    = Data segment
;               ES    = Host memory segment (If memory mapped)
;               BX:SI = Pointer to packet data
;               DI    = Current packet sent count
;
;       Registers on Exit:
;               AX-DX = Destroyed
;               BX:SI = Packet data pointer updated
;               DI    = Packet sent count updated
;
;**************************************************************************
Send_Burst      Proc    Near                 ; Send burst data procedure
        If      MEMORY EQ FALSE
        Set_IO                               ; Initialize the IO state           IO
        Endif
        mov     ax,ds:[Current_Low]          ; Get the current
        mov     cx,ds:[Current_High]         ;               address value (Bit)
        Write_HSTADDR   cx,ax                ; Setup to sent this data burst
        mov     cx,ds:[Burst_Size]           ; Get the number of words to send
        If      MEMORY EQ FALSE
        Set_IO  HSTDATA                      ; Keep register load out of loop    IO
        Endif
        Save    ds                           ; Save the current DS segment register
        mov     ds,bx                        ; Setup access to the packet data
Send_Data:
        lodsw                                ; Get the next word of packet data
        Write_HSTDATA   ax                   ; Write the data to the buffer
        loop    Send_Data                    ; Loop till all data words sent
        Restore ds                           ; Restore the DS segment register
        mov     ax,ds:[Sent_Low]             ; Get the packets
        mov     cx,ds:[Sent_High]            ;               sent address (Bit)
        Write_HSTADDR   cx,ax                ; Setup to update packets sent
        add     di,PACKETS_BURST             ; Update host packets sent count
        Write_HSTDATA   di                   ; Update TIGA packets sent count
        ret                                  ; Return control to the caller
Send_Burst      Endp                         ; End of the Send_Burst procedure
Code    Ends                                 ; End of the code segment
        End                                  ; End of the DM_Poly module
```

Appendix B

```
;   Include     register definitions
        .copy       regs.inc
;   Include macros
        .mlib       mac.lib
;   Declare globals
        .globl      _example_dmpoly
;   External References;  Arguments Received from Host
aTOTAL      .set    0               ;total number of packets
aPAGE       .set    10h             ;packets per page
aSENT       .set    20h             ;packets sent
aUSED       .set    30h             ;packets used
aDATA       .set    40h             ;data starts here;  Register usage
Rarg        .set    A0              ;pointer to arguments
Rccurrent   .set    A1              ;count (current)
Rctotal     .set    A2              ;count (total packets)
Rctemp      .set    A3              ;count (temp)
Rcpage      .set    A4              ;count (total per page)
Rdata       .set    A5              ;pointer to data
BURST_SIZE  .set    16
_example_dmpoly:
        mmtm    SP,A0,A1,A2,A3,A4,A5,A6,A7,A9
        Popc    Rarg                            ;get pointer to args
        move    *Rarg(aTOTAL),Rctotal,0         ;get total packets move    *Rarg(aPAGE),Rcpage,0           ;get packets per page
        clr     Rccurrent                       ;clear current count
page_loop:
        move    Rarg,Rdata
        addi    aDATA,Rdata
        Push    Rcpage
burst_loop:
        movk    BURST_SIZE,Rctemp               ;Rctemp is number pkts
        sub     Rctemp,Rctotal
        jrge    full_burst
        add     Rctotal,Rctemp
        clr     Rctotal
full_burst:
        add     Rctemp,Rccurrent                ;current count up to date
check_loop:
        move    *Rarg(aSENT),A8,0               ;Get count ready
        sub     Rccurrent,A8                    ;Sub off desired count
        jrlt    check_loop                      ;If not ready, then wait
packet_loop:
;-------------------------------------------------------------------;
;   Grab some data and do something with it                         ;
;-------------------------------------------------------------------;
        move    *Rdata+,A6,1
        move    *Rdata+,A7,1
        move    *Rdata+,A9,0
;-------------------------------------------------------------------;
        dsjs    Rctemp,packet_loop
        move    Rccurrent,*Rarg(aUSED),0
        move    Rctotal,Rctotal
        jrz     exit
        subk    BURST_SIZE,Rcpage
        jrgt    burst_loop
        Pop     Rcpage
        jruc    page_loop
exit:   Pop     Rcpage
        mmfm    SP,A0,A1,A2,A3,A4,A5,A6,A7,A9
        rets    2
```

Appendix C

```
;   Include     register definitions
        .copy       regs.inc
;   Include macros
        .mlib       mac.lib
;   Declare globals
        .globl      _PolyPixel
;   External References
        .globl      _srv_ipoly
;   Polypixel argument definition
aCOLOR      .set    0
aROP        .set    10h
aDATA       .set    20h         ; address passed to srv_ipoly
```

```
_PolyPixel:
    mmtm    SP,A0,A1,A2
    setf    16,0,0
    move    @CONTROL,A2,0       ;save CONTROL register
    Popc    A0                  ;get pointer to data
    move    *A0(aCOLOR),A1,0    ;get color
    move    A1,COLOR1           ;set gsp foreground color
    move    *A0(aROP),A1,0      ;get raster op
    setf    5,0,0
    move    A1,@CONTROL+10,0    ;use it to set gsp pp op
    setf    16,0,0
; Ready for poly data, push the address following the
; immediate data and the address of the service routine
    Push    STK
    move    A0,A8
    addi    aDATA,A8
    Pushc   A8                  ;push data address
    movi    drawpixels,A8
    Pushc   A8                  ;push item service routine
    calla   _srv_ipoly
; All done, cleanup and exit
    move    A2,@CONTROL,0       ;restore CONTROL register
    mmfm    SP,A0,A1,A2
    rets    2

;--------------------------------------------------------
;
;   Item service routine: drawpixels
;--------------------------------------------------------
drawpixels:
    mmtm    SP,B10,B11,B12,B13  ;save registers
    move    STK,B13
    move    *-B13,B10,1         ;pop number of items
    move    *-B13,B11,1         ;pop ptr to item data
    move    B13,STK
drawloop:
    addk    1,COLOR1
    move    *B11+,B12,1         ;get Y:X pixel coords
    pixt    COLOR1,*B12.XY      ;draw a pixel
    dsjs    B10,drawloop        ;loop until items exhausted
    mmfm    SP,B10,B11,B12,B13
    rets    2
```

Appendix D

```
;--------------------------------------------------------;
; TIGA Comm Driver    Copyright (c) 1989 Texas Instruments, Inc. ;
;--------------------------------------------------------;
;
; dm_ipoly- Direct mode immediate & poly data routine.
;
; This function sends a variable number of immediate short words
; followed by a variable amount of 'poly' type data to the 340. The
; polydata can be much larger than the minimun TIGA comm structure
; size so a special service routine is implemented on the 340 side
; which understands the protocol and calls the user poly routine with
; 'bursts' of poly data.
;
;--------------------------------------------------------;

; Public Declarations
;
        Public  _dm_ipoly

; External Declarations
```

```
;
Code    Segment Byte Public 'CODE'      ; Standard code segment
        Extrn   Exec_Cmd:Near            ; Execute TIGA command       (COM_ROUT)
        Extrn   Next_Buffer:Near         ; Get next buffer routine    (COM_ROUT)
        Extrn   Command:Near             ; Send command data routine       (DM)
        Extrn   Latch_Time:Near          ; Latch a value in system time
        Extrn   Check_Time:Near          ; Check if latched value has expired
Code    Ends                             ; End of code segment
Data    Segment Byte Public 'DATA'       ; Standard data segment
        Extrn   Current_Cmd:Word         ; Current command code           (DATA)
        Extrn   Old_ds:Word              ; Ds prior to driver call        (DATA)
        Extrn   Error_Function:Dword     ; Current error function address
        Extrn   Data_Field:Word
        Extrn   VarWords:Word           ; Words sent to GSP so far
        Extrn   Items:Word
        Extrn   ItemSz:Word
        Extrn   ItemSzBits:Word
        Extrn   ItemsPerCS:Word
        Extrn   ItemSEG:Word
        Extrn   csSentL:Word
        Extrn   csSentH:Word
        Extrn   csUsedL:Word
        Extrn   csUsedH:Word
        Extrn   csTmpL:Word
        Extrn   csTmpH:Word
        Extrn   csTopDataL:Word
        Extrn   csTopDataH:Word
        Extrn   Sent:Word
        Extrn   Used:Word
        Extrn   MustSend:Word
        Extrn   Timeout:Word
        Extrn   Latched_Time:Word
        Extrn   Wait_Time:Word
Data    Ends
;
;   Include Files
;
        Include Defs.Inc                ; Include hardware dependent items
        Include Macro.Inc               ; Include macro definitions
        Initialize                      ; Setup the processor options
        Page
;
;   Define the local stack frame
;
Stack_Frame     Struc                   ; Define the local stack frame
Saved_BP        Dw      ?               ; Saved BP register value
Ret_Addr        Dd      ?               ; Return address (Far return)
Command_Code    Dw      ?               ; Direct mode command number
Data_Count      Dw      ?               ; Number of data words
Start_Data      Dw      ?               ; Start of command data
Stack_Frame     Ends                    ; End of the local stack frame
;
;       Define the standard code segment
;
Code    Segment Byte Public 'CODE'      ; Standard code segment
        Assume  cs:Code, ds:Data, es:nothing
```

```
_dm_ipoly    Proc    Far
        push    bp
        mov     bp,sp
        Save    si,di,ds
        cld
        Setup_ds
        Setup_IF
        mov     ax,ss:[bp.Command_Code]  ;Get requested command
        mov     ds:[Current_Cmd],ax      ;Save it...
        call    Next_Buffer              ;Get addr of next comm structure
        mov     ax,ss:[bp.Data_Count]    ;get var number of immediate words
        mov     ds:[VarWords],ax         ;save it for later cs size calculation
        call    Command                  ;Call routine to send immediate data
        call    Polysend                 ;send remaining poly data
        xor     ax,ax
        xor     dx,dx                    ;return (long)0
        Restore si,di,ds
        pop     bp
        ret
_dm_ipoly    Endp
```

```
;---------------------------------------------------------------
;       +--------------------+
;       |    Immediate 1     |
;       +--------------------+
;       |    Immediate 2     |
;       +--------------------+
;       |      ItemSz        |
;       +--------------------+
;       |    ItemsTotal      |
;       +--------------------+
;       |    ItemsPerCS      |
;       +--------------------+
;       |       Sent         |
;       +--------------------+
;       |       Used         |
;       +--------------------+
;       |  Data starts here  |
;       +--------------------+
;---------------------------------------------------------------
Polysend   proc   near
        mov     ax,ss:[bp]               ;get Item size in bytes
        mov     ds:[ItemSz],ax           ;save it
        mov     bx,ax
        shl     bx,1
        shl     bx,1
        shl     bx,1                     ;Itemsize in bits
        mov     ds:[ItemSzBits],bx       ;save for later...
        Write_HSTDATA ax                 ;write it to the GSP
        add     bp,2                     ;update frame pointer
        mov     ax,ss:[bp]               ;get Items to Sent
        mov     ds:[Items],ax            ;save it
        Write_HSTDATA ax                 ;write it to the GSP
        add     bp,2                     ;update frame pointer
```

;----------------------------------------------------------------
; Next calculate how many Items will fit in the room that remains in
; the comm structure, and send it to the GSP. The formula used to
; calculate this is as follows:
;
; ItemsPerCS = (csSiz - ((VarWords*2) + FixWords) ) / ItemSz
;
; Where: csSIz    = size of gsp comm data stucture
;        VarWords = Number of immediate words sent
;        FixWords = Number of words we always sent (ItemSz,etc)
;        ItemSz   = Item size in bytes
;----------------------------------------------------------------

```
        mov     bx,ds:[VarWords]
        shl     bx,1
        add     bx,10                   ;add fixed words
        mov     ax,ds:[Data_Field]      ;Get the cs data field size(words)
        shl     ax,1                    ;05/23/89: convert to bytes
        sub     ax,bx
        mov     bx,ds:[ItemSz]
        cmp     bx,1
        jz      skipdiv
        cmp     bx,2
        jnz     dodiv
        shr     ax,1
        jmp     skipdiv
dodiv:
        xor     dx,dx
        div     bx                      ;want to make this 32 bit div
skipdiv:
        mov     ds:[ItemsPerCS],ax      ;save items per CS
        Write_HSTDATA ax                ;write it to GSP
```

;----------------------------------------------------------------
; HADDH:HADDL now contains the address where the csSent, csUsed, and
; top of data addresses will be located. Read and save them for use
; in the transfer loop.
;----------------------------------------------------------------

```
        Read_HSTADDR    dx,ax
        mov     ds:[csSentL],ax
        mov     ds:[csSentH],dx
        xor     ax,ax
        Write_HSTDATA   ax              ;Clear [sent] field
        Read_HSTADDR    dx,ax
        mov     ds:[csUsedL],ax
        mov     ds:[csUsedH],dx
        xor     ax,ax
        Write_HSTDATA   ax              ;Clear [used] field
        Read_HSTADDR    dx,ax
        mov     ds:[csTopDataL],ax
        mov     ds:[csTopDataH],dx
        xor     ax,ax
        mov     ds:[Sent],ax
        mov     ds:[Used],ax
```

;----------------------------------------------------------------
; Start the 340 processing.
;----------------------------------------------------------------

```
        call    Exec_Cmd                ;Start 340 processing
        mov     si,ss:[bp]
        add     bp,2
        mov     ax,ss:[bp]
        mov     ds:[ItemSEG],ax
```

```
;-----------------------------------------------------------------;
; Send Items until exhausted.                                     ;
;    1) Calculate the number of items that we need to send. This will ;
;       either be the number of ItemsPerCs, or the number of items ;
;       remaining to send, whichever is smaller.                   ;
;-----------------------------------------------------------------;
fillcsloop:
        mov     ax,ds:[csTopDataL]
        mov     dx,ds:[csTopDataH]
        mov     ds:[csTmpL],ax
        mov     ds:[csTmpH],dx
        mov     cx,ds:[ItemsPerCS]
        cmp     cx,ds:[Items]
        jl      mustsendset
        mov     cx,ds:[Items]
mustsendset:
        mov     ds:[MustSend],cx
        sub     ds:[Items],cx
```

```
;-----------------------------------------------------------------;
; This loop sends [mustsend] items. These will be sent in bursts as ;
; the 340 is ready to accept them. The amount of items we can send in ;
; a burst is equal to [Used] + [ItemsPerCs] - [Sent]. If we can send ;
; more than we [mustsend], then only send [mustsend] items.        ;
;-----------------------------------------------------------------;
retry:
        mov     ax,ds:[Timeout]         ;initialize timeout value
        mov     ds:[Wait_Time],ax
        call    Latch_Time
waitforGSP:
        mov     ax,ds:[csUsedL]
        mov     dx,ds:[csUsedH]
        WRITE_HSTADDR   dx,ax
        READ_HSTDATA    ax              ;get used count
        mov     bx,ds:[ItemsPerCS]
        add     ax,bx
        sub     ax,ds:[Sent]
        or      ax,ax
        jnz     abletosend              ;wait till we cansend at least 1 item
;-----------------------------------------------------------------;
        call    Check_Time
        cmp     ds:[Wait_Time],0
        je      TimedOut
        jmp     waitforGSP              ;Go retry to get next buffer
TimedOut:
        mov     ax,TIMEOUT_STAT         ;Get the buffer timeout error code
        Call_ErrorHandler ax            ;Call error handler
        jmp     retry                   ;Go retry
;-----------------------------------------------------------------;
```

```
abletosend:
        cmp     ax,ds:[MustSend]          ;is cansend > mustsend?
        jl      cansendset
        mov     ax,ds:[MustSend]
cansendset:
        sub     ds:[MustSend],ax
        call    BurstSend
        cmp     ds:[MustSend],0
        jnz     waitforGSP
        cmp     ds:[Items],0
        jz      exit_Polysend
        jmp     fillcsloop
exit_Polysend:
        ret
Polysend        endp ;----------------------------------------------------------------;
; Send a burst of items to the GSP. After every item sent the [Sent]   ;
; count is updated in GSP memory also so it can get started on the item ;
; right away.                                                    ;
;                                                                ;
; Upon Entry:         ax = Number of Items to send               ;
;                     ds:si = Pointer to item data               ;
;               csTmpH:csTmpL = Current Gsp address              ;
;                                                                ;
;  Upon Exit: ds:si = Updated pointer                            ;
;----------------------------------------------------------------;
BurstSend       proc    near
        mov     di,ax
SentItems:
        mov     ax,ds:[csTmpL]
        mov     dx,ds:[csTmpH]
        Write_HSTADDR   dx,ax             ;set GSP data address
        mov     cx,ds:[ItemSz]            ;get ItemSz (bytes)
        shr     cx,1                      ;(words)
        mov     ax,ds:[ItemSEG]
        Push    ds
        mov     ds,ax
SendItemData:
        lodsw
        WRITE_HSTDATA ax
        loop    SendItemData
        Pop     ds
; Update GSP data address
        mov     ax,ds:[ItemSzBits]
        clc
        adc     ds:[csTmpL],ax
        jnc     nooverflow
        add     ds:[csTmpH],1 nooverflow:
        mov     ax,ds:[csSentL]
        mov     dx,ds:[csSentH]
        Write_HSTADDR   dx,ax
        mov     ax,ds:[Sent]
        add     ax,1
```

```
            mov     ds:[Sent],ax            ;update [Sent]
            Write_HSTDATA ax
            dec     di
            jnz     SentItems
            ret
BurstSend   endp
Code   Ends
            end
nooverflow:
            mov     ax,ds:[csSentL]
            mov     dx,ds:[csSentH]
            Write_HSTADDR  dx,ax
            mov     ax,ds:[Sent]
            add     ax,1
            mov     ds:[Sent],ax            ;update [Sent]
            Write_HSTDATA ax
            dec     di
            jnz     SentItems
            ret
BurstSend   endp
Code   Ends
            end
```

Appendix E

```
;-----------------------------------------------------------------;
; TIGA - Graphics Manager function     (c) 1989 Texas Instruments, Inc ;
;-----------------------------------------------------------------;
; dm_ipoly service routine.                                       ;
;                                                                 ;
; Usage: dm_ipoly(FnAddr, ptdata)                                 ;
;           FnAddr  - Address of function to be executed          ;
;           ptdata  - Pointer to the argument packets to pass to the ;
;                     desired function.                           ;
;                                                                 ;
;                                                                 ;
;                                                                 ;
;-----------------------------------------------------------------;
; Include GSP register definitions
        .copy    gspregs.inc
; Include macros
        .mlib    gspmac.lib
; Declare globals
        .globl   _srv_ipoly
; External References ; Arguments Received from Host
aISIZE   .set    0           ;Item size in bytes
aITOTAL  .set    10h         ;Items Total
aIPERCS  .set    20h         ;Items Per Comm Struct
aISENT   .set    30h
aIUSED   .set    40h
aDATA    .set    50h         ;data starts here ; Register usage
Rarg            .set    A0      ;pointer to arguments
Risize          .set    A1      ;Item Size in bytes
```

```
Ritotal     .set    A2      ;Items (total number of)
Ripercs     .set    A3      ;Items (per comm struct)
Rdata       .set    A4      ;pointer to data start (const)
Rused       .set    A5      ;counts items we have used
Ritemsrv    .set    A6
Rtmp        .set    A7      ;must be odd
Rtosrv      .set    A9

_srv_ipoly:
        mmtm    SP,A0,A1,A2,A3,A4,A5,A6,A7,A9
        Popc    Ritemsrv
        Popc    Rarg                        ;get pointer to args
        move    *Rarg(aISIZE),Risize,0      ;get Item Size (bytes)
        sll     3,Risize                    ;bits
        move    *Rarg(aITOTAL),Ritotal,0    ;get Items total
        move    *Rarg(aIPERCS),Ripercs,0    ;get Items per CS
        clr     Rused
;------------------------------------------------------------------;
; Reset to start of data, and determine the number of items which will  ;
; be serviced before reset to start of data again.                 ;
;------------------------------------------------------------------;
reset_to_csdata:
        move    Rarg,Rdata
        addi    aDATA,Rdata
        move    Ripercs,Rtosrv              ;service items per CS
        cmp     Ripercs,Ritotal             ;unless total is less
        jrgt    tosrv_set
        move    Ritotal,Rtosrv              ;in which case srv total remaining
tosrv_set:
        sub     Rtosrv,Ritotal
;------------------------------------------------------------------;
; This loop gets and services Rtosrv items.                        ;
;------------------------------------------------------------------;
waitforitems:
        move    *Rarg(aISENT),Rtmp,0
        sub     Rused,Rtmp
        jrle    waitforitems
;------------------------------------------------------------------;
; One or more items have been received. Now we have to determine how
; many of the items are usable at this time. There are two cases:
; case 1: All the items received are sequential in the queue, in which
;         case we take them all.
; case 2: Items received wrap the end of the CS, in which case we just
;         take the ones that fit before the end of the CS, and service
;         them, this will cause a reset to top of csdata at the end of
;         this loop.
;------------------------------------------------------------------;
        cmp     Rtmp,Rtosrv
        jrge    inqueue                     ;case 1: items fit in queue
        move    Rtosrv,Rtmp
inqueue:
        sub     Rtmp,Rtosrv
;------------------------------------------------------------------;
; Call routine to service the number of sequential items we have in
; the queue.
;------------------------------------------------------------------;
```

```
        move    Rtmp,Rtmp
        jrz     skipcall
        Push    STK
        Pushc   Rdata
        Pushc   Rtmp
        call    Ritemsrv
skipcall:
;----------------------------------------------------------------;
        add     Rtmp,Rused              ;add Items serviced to used count
        move    Rused,*Rarg(aIUSED),0   ;let the host know
        move    Rtosrv,Rtosrv
        jrz     endofcs
        mpys    Risize,Rtmp             ;update data pointer
        add     Rtmp,Rdata              ;Rdata += sizeof(ITEMS)
        jruc    waitforitems
endofcs:
        move    Ritotal,Ritotal
        jrgt    reset_to_csdata
exit_srvipoly:
        mmfm    SP,A0,A1,A2,A3,A4,A5,A6,A7,A9
        rets    2
```

What is claimed is:

1. A method of using a multiprocessor computer system having a first processor for calling extended functions, a second processor for executing extended functions and a communications buffer of a predetermined data size for communications between the first and second processors, said communications buffer implemented as a shared address space accessible by both the first and second processor, each said extended function having at least one argument specifying data that is greater in size than the predetermined data size of the communications buffer, said method comprising the steps of:

calling one of said extended functions from a main program running on the first processor;

dividing the argument data corresponding to said called extended function into a plurality of data packets of predetermined packet size corresponding to said called extended function, said predetermined packet size permitting a plurality of said data packets to be simultaneously stored within the communications buffer;

executing a first communications routine running on the first processor via a first entry point command corresponding to said called extended function, the step of executing said first communications routine including writing an extended function and a data packet count corresponding to said called extended function into the communications buffer, said data packet count indicating a total number of data packets of argument data to be sent to the second processor for said called extended function, sequentially (a) writing one of said data packets into the communications buffer, (b) determining if one of said data packets has been read from the communications buffer by the second processor, (c) writing another one of said data packets into the communications buffer if a number of said data packets written into the communications buffer minus a number of said data packets read from the communications buffer indicates free data space within the communications buffer greater than said predetermined packet size, until said plurality of data packets have been written into the communications buffer;

reading said extended function identifier and said data packet count from the communications buffer by the second processor;

executing a second communications routine running on the second processor, the step of executing said second communications routine including sequentially (a) reading one of said data packets from the communications buffer, (b) indicating one of said data packets has been read from the communications buffer, and (c) determining whether said one of said data packets read from said communications buffer is a last one of said data packets for said called extended function by comparing a number of data packets read from said communications buffer with said data packet count;

if it is determined in said determining step that said one of said data packets is not said last one of said data packets, repeating said reading, indicating, and determining steps for another one of said data packets, and if it is determined in said determining step that said one of said data packets is said last one of said data packets, performing said called extended function corresponding to said extended function identifier on the second processor.

2. The method as claimed in claim 1, wherein the first processor includes a memory for storing arguments of extended functions and wherein:

said first entry point command includes an indication of said data packet count, said predetermined packet size and an indication of a location of the argument data within the memory.

3. The method as claimed in claim 1, wherein:
the extended function identifier consists of a command number.

4. A method of using a multiprocessor computer system having a first processor for calling extended functions, a second processor for executing extended functions and a communications buffer of a predetermined data size for communications between the first and second processors, said communications buffer implemented as a shared address space accessible by both the first and second processor, each extended function having at least one first argument specifying data that is greater in size than the predetermined data size of the communications buffer and at least one second argument specifying data required for performing that extended function that is smaller in size than the predetermined data size of the communications buffer, said method comprising the steps of:

calling an extended function from a main program running on the first processor;

dividing the first argument data corresponding to said called extended function into a plurality of data packets of predetermined packet size corresponding to said called extended function, said predetermined packet size permitting a plurality of said data packets to be simultaneously stored within the communications buffer;

executing a first communications routine running on the first processor via a first entry point command corresponding to said called extended function, the step of executing said first communications routine including writing an extended function identifier and a data packet count corresponding to said called extended function into the communications buffer, said data packet count indicating a total number of data packets of said first argument data to be sent to the second processor for said called extended function, writing the second argument data into the communications buffer, determining if the second argument data has been read from the communications buffer, sequentially (a) writing one of said data packets into the communications buffer, (b) determining if one of said data packets has been read from the communications buffer by the second processor, (c) writing another one of said data packets into the communications buffer if a number of said data packets written into the communications buffer minus a number of said data packets read from the communications buffer indicates free data space within the communications buffer greater than said predetermined packet size, until said plurality of data packets have been written into the communications buffer;

reading said extended function identifier and said data packet count from the communications buffer by the second processor;

executing a second communications routine running on the second processor, the step of executing said second communications routine including reading the second argument data from the communications buffer, indicating the second argument data has been read from the communications buffer, sequentially (a) reading one of said data packets from the communications buffer, (b) indicating one of said data packets has been read from the communications buffer, and (c) determining whether said one of said data packets read from said communications buffer is a last one of said data packets for said called extended function by comparing a number of data packets read from said communications buffer with said data packet count;

if it is determined in said determining step that said one of said data packets is not said last one of said data packets, repeating said reading, indicating, and determining steps for another one of said data packets, and if it is determined in said determining step that said one of said data packets is said last one of said data packets, performing said called extended function corresponding to said extended function identifier on the second processor.

5. The method as claimed in claim 4, wherein the first processor includes a memory for storing arguments of extended functions and wherein:
said first entry point command includes an indication of said data packet count, said predetermined packet size and an indication of a location of the first argument data within the memory.

6. The method as claimed in claim 4, wherein the first processor includes a memory for storing arguments of extended functions and wherein:
said first entry point command includes an indication of a number of said second arguments, and each second argument.

7. The method as claimed in claim 4, wherein the first processor includes a memory for storing arguments of extended functions and wherein:
said first entry point command includes an indication of said data packet count, said predetermined packet size, an indication of a location of the first argument data within the memory, an indication of a number of said second arguments, and each second argument.

8. The method as claimed in claim 4, wherein:
the extended function identifier consists of a command number.

9. A method of using a multiprocessor computer system having a first processor for calling extended functions, a second processor for executing extended functions and a communications buffer of a predetermined data size for communications between the first and second processors, said communications buffer implemented as a shared address space accessible by both the first and second processor, each extended function being one of (1) a first type extended function having at least one argument specifying data that is greater in size than the predetermined data size of the communications buffer, and (2) a second type extended function having at least one first argument specifying data that is greater in size than the predetermined data size of the communications buffer and at least one second argument specifying data required for performing that extended function that is smaller in size than the predetermined data size of the communications buffer, said method comprising the steps of:

calling an extended function from a main program running on the first processor;

dividing the first argument data corresponding to said called extended function into a plurality of data packets of predetermined packet size corresponding to said called extended function, said predetermined packet size permitting a plurality of said data packets to be simultaneously stored within the communications buffer;

if said extended function is a first type extended function, executing a first communications routine running on the first processor via a first entry point command corresponding to said called extended function, the step of executing said first communications routine including writing an extended function identifier and a data packet count corresponding to said called extended function into the communications buffer, said data packet count indicating a total number of data packets of said argument data to be sent to the second processor for said called extended function, sequentially (a) writing one of said data packets into the communications buffer, (b) determining if one of said data packets has been read from the communications buffer by the second processor, (c) writing another one of said data packets into the communications buffer if a number of said data packets written into the communications buffer minus a number of said data packets read from the communications buffer indicates free data space within the communications buffer greater than said predetermined packet size, until said plurality of data packets have been written into the communications buffer;

if said extended function is a second type extended function, executing the first communications routine running on the first processor via a second entry point command corresponding to said called extended function, the step of executing said first communications routine including writing an extended function identifier and a data packet count corresponding to said called extended function into the communications buffer, said data packet count indicating a total number of data packets of said first argument data to be sent to the second processor for said called extended function, writing the second argument data into the communications buffer, determining if the second argument data has been read from the communications buffer, sequentially (a) writing one of said data packets into the communications buffer, (b) determining if one of said data packets has been read from the communications buffer by the second processor, (c) writing another one of said data packets into the communications buffer if the number of data packets written into the communications buffer minus the number of data packets read from the communications buffer indicates free data space within the communications buffer greater than said predetermined packet size, until said plurality of data packets have been written into the communications buffer;

reading said extended function identifier and said data packet count from the communications buffer by the second processor;

if said extended function identifier indicates said extended function is the first type extended function, executing a second communications routine running on the second processor, the step of executing said second communications routine including sequentially (a) reading one of said data packets from the communications buffer, (b) indicating one of said data packets has been read from the communications buffer, and (c) determining whether said one of said data packets read from said communications buffer is a last one of said data packets for said called extended function by comparing a number of data packets read from said communications buffer with said data packet count;

if it is determined in said determining step that said one of said data packets is not said last one of said data packets, repeating said reading, indicating, and determining steps for another one of said data packets, and if it is determined in said determining step that said one of said data packets is said last one of said data packets, performing said called extended function corresponding to said extended function identifier on the second processor;

if said extended function identifier indicates said extended function is the second type extended function, executing a second communications routine running on the second processor, the step of executing said second communications routine including reading second argument data from the communications buffer, indicating the second argument data has been read from the communications buffer, sequentially (a) reading one of said data packets from the communications buffer, (b) indicating one of said data packets has been read from the communications buffer, and (c) determining whether said one of said data packets read from said communications buffer is a last one of said data packets for said called extended function by comparing a number of data packets read from said communications buffer with said data packet count;

if it is determined in said determining step that said one of said data packets is not said last one of said data packets, repeating said reading, indicating, and determining steps for another one of said data packets, and if it is determined in said determining step that said one of said data packets is said last one of said data packets, performing said called extended function corresponding to said extended function identifier on the second processor.

10. The method as claimed in claim 9, wherein the first processor includes a memory for storing arguments of extended functions and wherein:

said first entry point command includes an indication of a number of said plurality of packets of said data packet count, said predetermined packet size and an indication of a location of the argument data within the memory.

11. The method as claimed in claim 9, wherein the first processor includes a memory for storing arguments of extended functions and wherein:

said first entry point command includes an indication of a number of said second arguments, and each second argument.

12. The method as claimed in claim 9, wherein the first processor includes a memory for storing arguments of extended functions and wherein:

said first entry point command includes an indication of said data packet count said predetermined packet size, an indication of a location of the first argument data within the memory, an indication of a number of said second arguments, and each second argument.

13. The method as claimed in claim 9, wherein:
the extended function identifier consists of a command number.

* * * * *